Nov. 23, 1948.    L. R. BUCKENDALE ET AL    2,454,271
FRICTION COUPLING DEVICE
Filed March 27, 1944    4 Sheets-Sheet 1
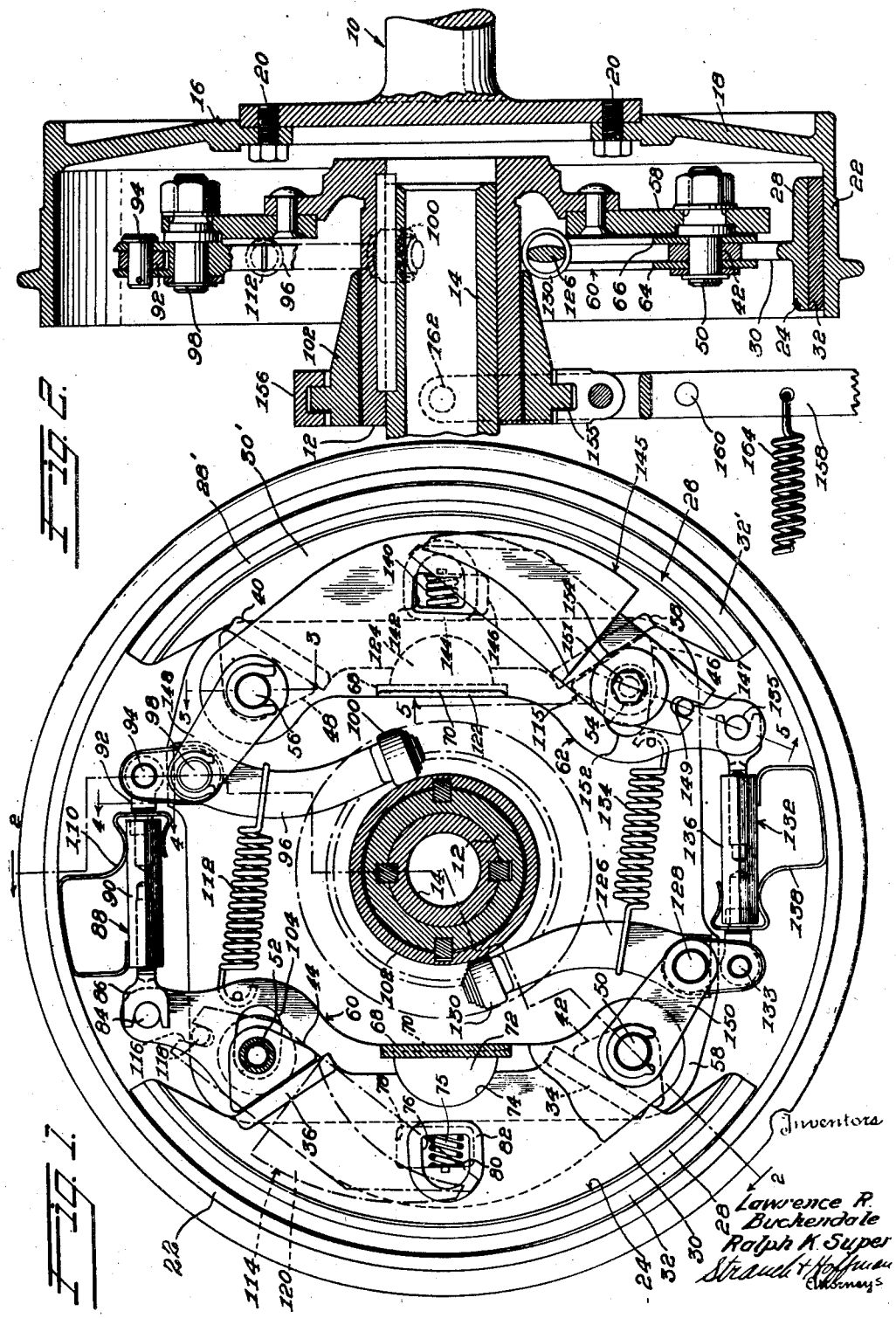
Inventors
Lawrence R. Buckendale
Ralph K. Super
Strauch & Hoffman
Attorneys

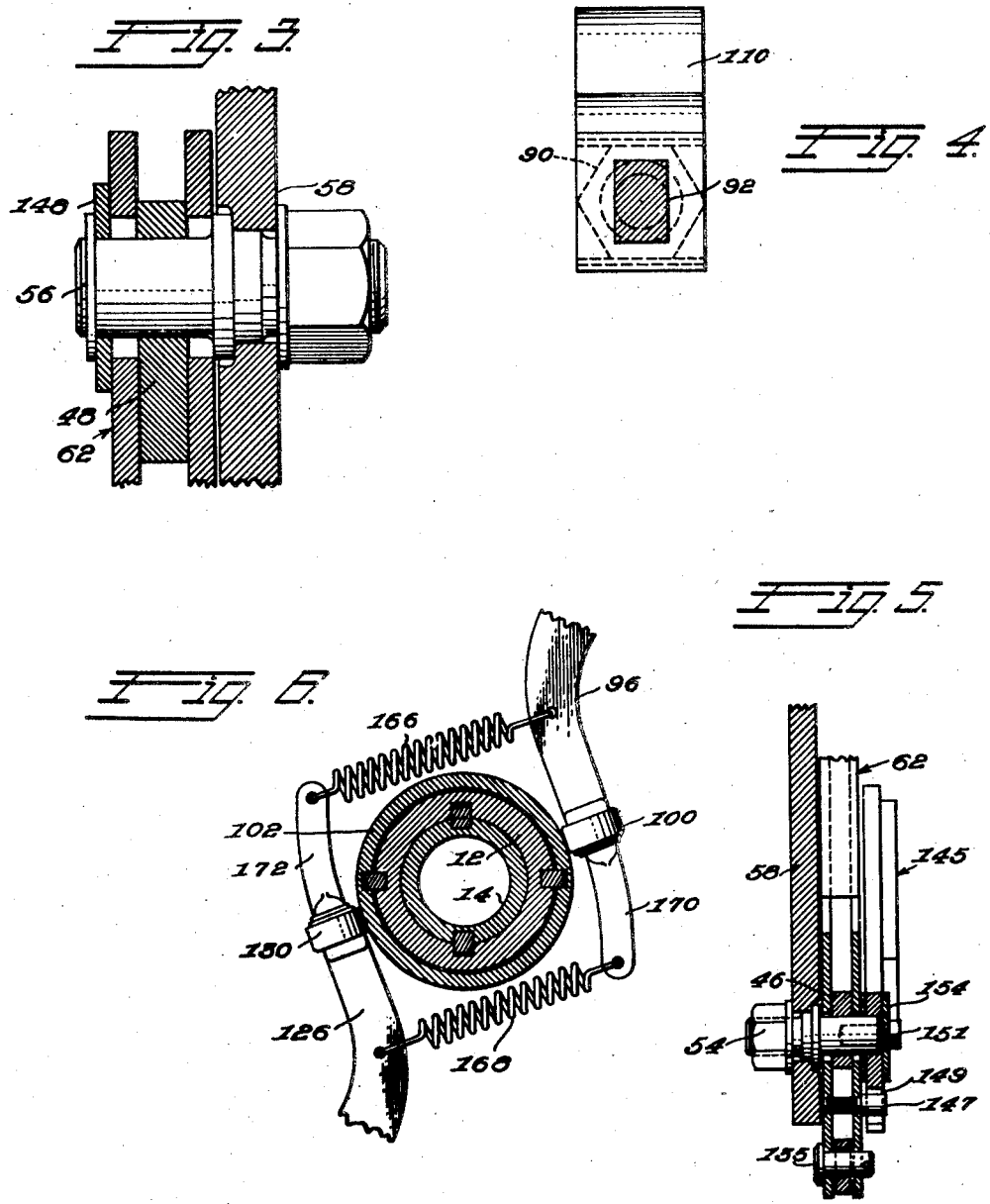

Nov. 23, 1948.  L. R. BUCKENDALE ET AL  2,454,271
FRICTION COUPLING DEVICE
Filed March 27, 1944  4 Sheets-Sheet 3
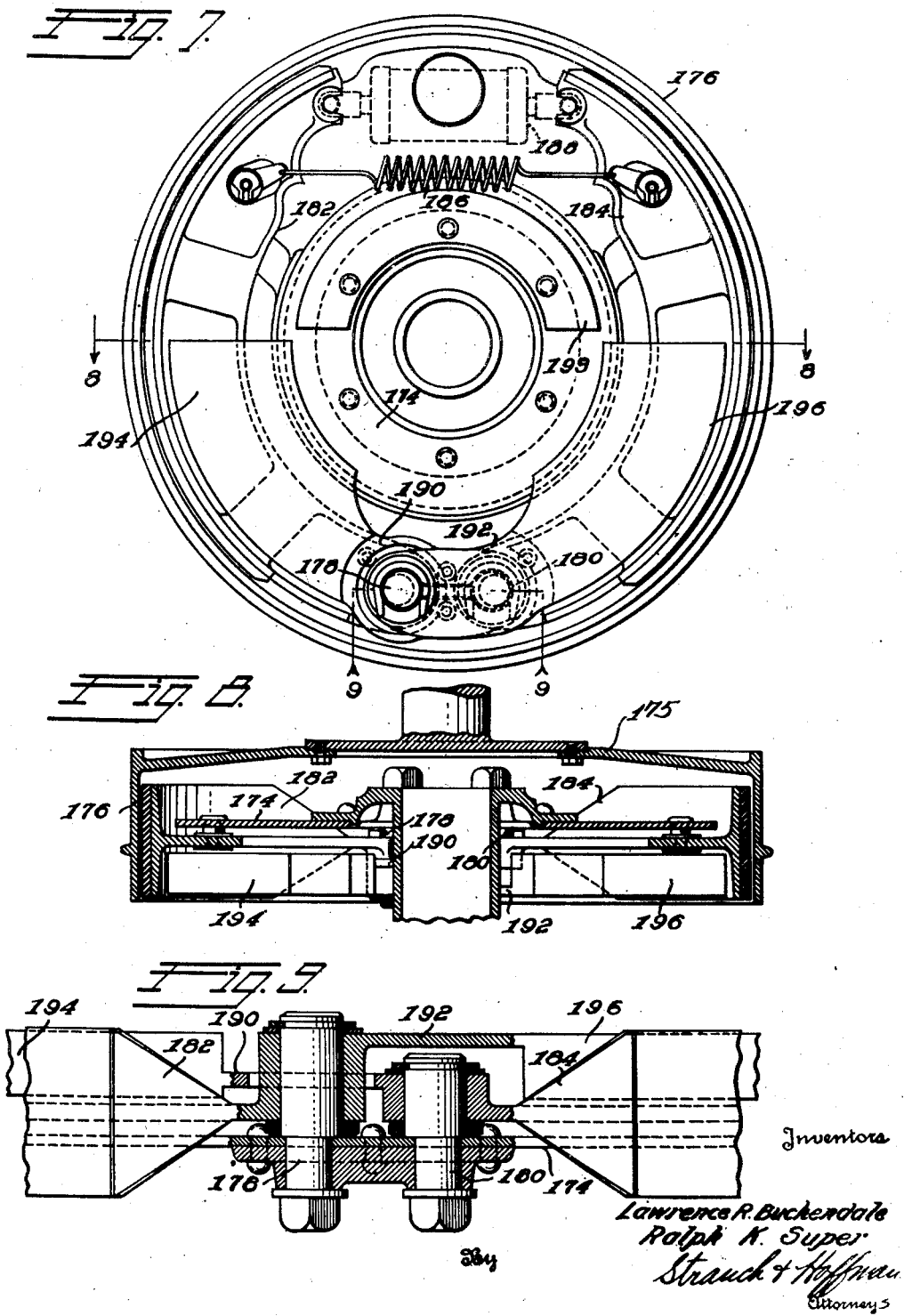

Nov. 23, 1948.  L. R. BUCKENDALE ET AL  2,454,271
FRICTION COUPLING DEVICE

Filed March 27, 1944  4 Sheets-Sheet 4

Lawrence R. Buckendale
Ralph K. Super
INVENTOR

BY Strauch & Hoffman
ATTORNEY

Patented Nov. 23, 1948

2,454,271

UNITED STATES PATENT OFFICE 2,454,271

FRICTION COUPLING DEVICE

Lawrence R. Buckendale and Ralph K. Super, Detroit, Mich., assignors to The Timken-Detroit Axle Company, Detroit, Mich., a corporation of Ohio Application March 27, 1944, Serial No. 528,276

6 Claims. (Cl. 192—76)

This invention relates to improvements in friction coupling devices and has particular reference to an improved power transmitting clutch for a machine drive such as a hoisting drum or a heavy duty vehicle such as a tractor, military tank or heavy duty prime mover. While the improved coupling construction is highly useful in any type of heavy duty apparatus, it is of particular utility in devices such as derricks and power shovels where frequent use of the clutch under high torque conditions is necessary.

Previous mechanical friction couplings, such as brakes or clutches, have been of three general types; that is, either drum and band, drum and external or internal shoe, or disk devices. In the automotive art it has become customary to utilize drum and shoe devices for brakes and disk devices for power transmitting clutches. This utilization has come about because of various practical considerations based on the characteristics of the three forms of construction at their present known stage of development. The drum and band type of friction coupling is now obsolete as to automotive applications and although still used to some extent in other applications, such as power shovels and hoisting equipment, will not be further considered as its characteristics are well known. The drum and shoe and the disk type couplings, which are the forms in principal use at present, have acquired distinct uses in automotive applications. For example, the drum and shoe type of device, while capable of handling heavy loads and rapidly dissipating friction generated heat, is not, as now used, as controllable by slight variations of control forces as is the disk type and requires more frequent adjustment and servicing than does the conventional disk clutch. The efficiency of the drum and shoe arrangement in dissipating heat has rendered its use almost imperative in vehicle brakes, since the various attempts to use the disk type construction for this purpose have generally met with failure because of overheating of the parts thereof. The disk type has, however, been used successfully in the transmission of engine power because of the lower torque loads involved and the short duration of periods of frictional operation of the usual vehicle clutch. However, with the increased torque and the extended periods of frictional operation now consequent to the operation of heavy machinery, such as hoisting equipment, shovels, tractors, military tanks and heavy duty prime movers, difficulty is being experienced with overheating and slipping of the disk or external band type clutches previously used in such installations.

While the torque transmitting and heat dissipating qualities of the drum and shoe type of construction have been known for a long time from their use as vehicle brakes, the use of this construction as a clutch for high speed, high torque operation has presented such serious problems that, so far as we are aware, no successful attempt in this direction has so far been made. We realize that drum and shoe clutches have been previously used in such devices as steam traction engines and line shaft pulleys as exemplified in Patent No. 2,277,659, issued March 31, 1942, to Bokich for "Friction drum," Patent No. 1,011,355, issued December 12, 1911, to McAdams for "Combined loose pulley and clutch," and Patent No. 776,806, issued December 6, 1904, to Sargent for "Friction clutch."

These, however, are all for large slow speed devices requiring no great accuracy of control and do not teach the principles necessary to convert this type of clutch for use in modern high speed installations.

When an internal shoe and drum friction device is used as a brake, the shoe members and operating mechanism are non-rotatable, but when used as a clutch the entire mechanism is rotated at high speed and it becomes necessary, not only to provide an operative connection between the relatively stationary control mechanism and the rotatable clutch actuating mechanism and to balance all of the components within the clutch to avoid rotational vibration, but to also counterbalance the centrifugal force acting on the movable shoe elements so that the control force will remain substantially constant regardless of the rotational speed of the clutch. In order to accomplish this it is necessary to provide in a drum and shoe type friction coupling a mechanism which is substantially balanced statically and dynamically and which is substantially free of any servo or self energizing action. This requires that centrifugal forces acting on the coupling parts be accurately counterbalanced.

Since clutches are, of necessity, usually much more inaccessible than brakes, it is also highly desirable to extend the normal brake adjustment and service intervals when this type of friction coupling device is used as a power transmitting clutch by incorporating improvements in design and features of adjustment therein. The inclusion of means compensating the mechanism for thermal expansion effects of the clutch drum has been found highly advantageous in reducing the frequency of adjustments by utilizing any excess pedal or lever movement over that necessary to bring the shoes into engagement with the drum to compensate for lining wear rather than thermal expansion of the brake drum.

With the above considerations in view, it is the general object of our invention to utilize as a high speed power transmitting clutch a shoe and drum friction coupling device of the type now conventionally employed as vehicle brakes and to provide a clutch construction having the load handling and cooling characteristics of the shoe and drum type of construction with the durability and positive and uniform control characteristic of the disk type construction now commonly used in vehicle power transmitting clutches.

A somewhat more specific object resides in the provision of an improved friction coupling having a rotatable drum member and friction shoes and shoe actuating mechanism within said drum member and rotatable therewith when frictionally coupled, in which the shoes and respective shoe actuating mechanisms are centrifugally balanced against each other.

A further object resides in the provision of an improved friction coupling of the character indicated, including centrifugally balanced means operative to connect the rotatable shoe actuating mechanism with a non-rotatable control mechanism and provide a positive connection for moving the shoes upon movement of the control mechanism.

A still further object resides in the provision of an improved friction coupling device having an expansible shoe and drum construction in which the shoe elements are urged to retracted position by a force having a predetermined relationship to the centrifugal force acting on the shoe elements.

Another object resides in the provision of an improved friction coupling device having shoe elements urged to a position against limit stops by shoe contracting forces greater by a substantially constant predetermined amount than the shoe expanding forces incident to the action of centrifugal force on the mass of the shoe elements.

Another object resides in the provision of an improved drum and shoe type friction coupling of the character indicated having improved control sensitivity by elimination of the servo action and by provision of substantial dynamic and static balance of the parts.

Yet another object resides in the provision of an improved friction coupling of the character indicated which will stay in adjustment for extended periods and in which the wear of the friction material is uniform and relatively slow because of the inclusion of means compensating the thermal expansion induced variations in the coupling parts.

Another object resides in the provision of an improved friction coupling of the character indicated in which the control force necessary to disengage the coupling or to permit smooth engagement of the coupling is substantially constant, regardless of the rotational speed of the coupling.

It is also an object to provide a friction coupling of the character indicated which is entirely free running when disengaged and which is engaged or disengaged by a substantially constant degree of movement of a control element.

Other objects will be more particularly pointed out hereinafter or will become apparent as the description proceeds.

In the accompanying drawings, in which like reference numerals are used to designate similar parts throughout, there is illustrated a suitable embodiment for the purpose of disclosing the invention and two somewhat modified forms thereof. The drawings, however, are for the purpose of illustration only and are not to be taken in a limiting or restrictive sense since it will be apparent to those skilled in the art that various changes in the illustrated arrangements may be resorted to without in any way exceeding the scope of the invention.

In the drawings:

Figure 1 is an end elevational view of a friction coupling device constructed according to the invention;

Figure 2 is a longitudinal sectional view of the improved coupling device taken on the line 2—2 of Figure 1;

Figure 3 is a sectional view of a fragmentary portion of the improved coupling device taken on the line 3—3 of Figure 1 and showing one of the anchor pivots for a friction shoe actuating lever;

Figure 4 is a sectional view of a fragmentary portion of the improved coupling device taken on the line 4—4 of Figure 1 and showing in cross section one of the adjustable strut members operatively connecting the friction shoe actuating levers;

Figure 5 is a sectional view of a fragmentary portion of the improved coupling device taken on the line 5—5 of Figure 1 showing one of the anchor pins for the brake actuating lever and portions of the brake lever and counterweight mounted thereon;

Figure 6 is a view similar to Figure 1 showing a modification of a portion of the mechanism;

Figure 7 is a view similar to Figure 1 showing a further modified form of the device;

Figure 8 is a sectional view taken on line 8—8 of Figure 7;

Figure 9 is a sectional view taken on the line 9—9 of Figure 7, and

Figure 10:
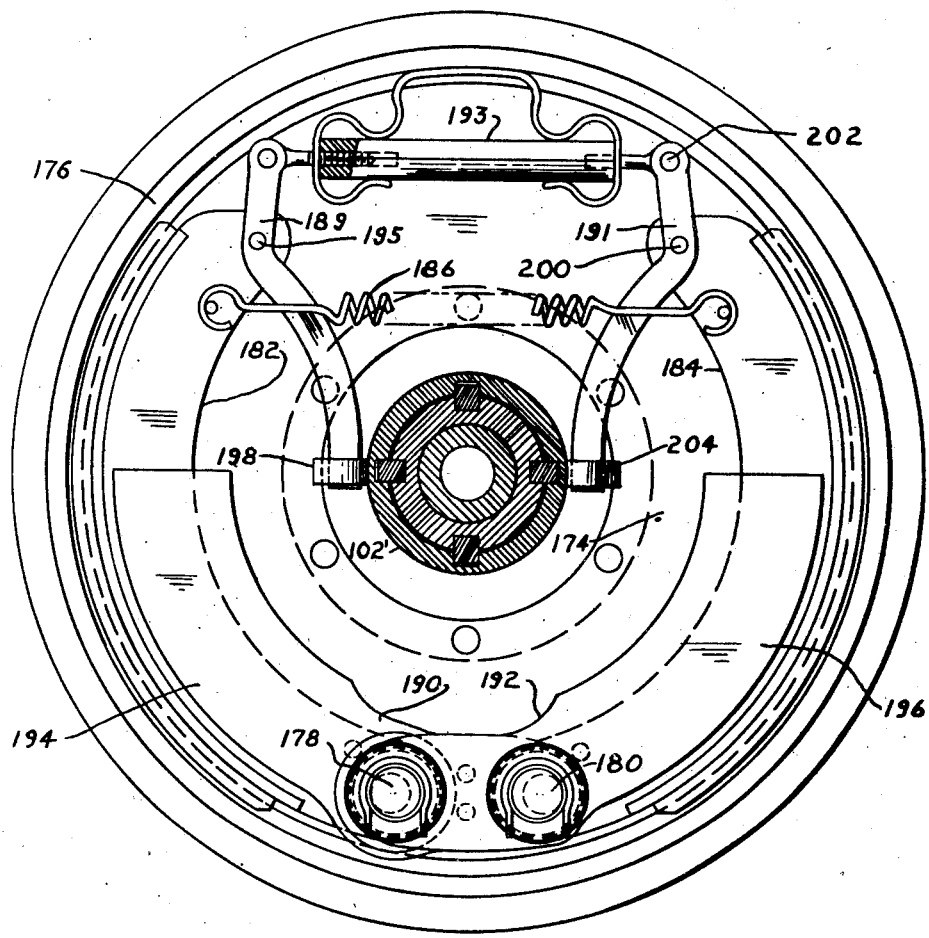
Figure 10 is a view similar to Figure 7 of the modified coupling arrangement of Figure 7 with a thermal expansion compensating element incorporated therein.

Referring to the drawings in detail, the numeral 10 generally indicates a rotatable drive member which may be an engine crankshaft or a drive shaft driven directly by the engine or through a suitable transmission gear train, while the numeral 12 indicates a rotatable driven member, which may be hollow and interiorly splined to telescopically receive the exteriorly splined end portion of a driven shaft 14. The coupling device or clutch operates to frictionally connect the member 10 with the members 12 and 14 when engaged and to drivingly disconnect the driving and driven members when disengaged.

The drive member 10 carries a bell housing, generally indicated by 16, in the form of a brake drum having a web portion 18 secured to a flange on the drive member by suitable means, such as the bolts or cap screws 20, and an integral flange portion 22 overlying the friction shoes, generally indicated at 24 and 26. Each shoe comprises an annular flange portion, as indicated at 28 and 28', extending over a portion of the circumferential extent of the drum flange, a web portion, as indicated at 30 and 30', and a lining of friction material, as indicated at 32 and 32'. The two friction shoes are similar in construction and are carefully balanced as to mass and are diametrically oppositely disposed within the drum so that, as they rotate with the driven member 12, they will be balanced one against the other and will not cause vibration of the friction coupling mechanism.

The brake shoe 24 is provided adjacent its ends with transverse abutment plates 34 and 36 secured to the ends of the web portion thereof and the brake shoe 26 is provided with similar abutment plates 38 and 40. These abutment plates 34, 36, 38 and 40 cooperate with respective abutments 42, 44, 46, and 48 pivotally mounted on respective anchor pins 50, 52, 54 and 56 projecting outwardly from the support plate 58 fixed upon the driven member 12.

The abutments 42, 44, 46 and 48 are rotatable on the respective anchor pins and the abutment contacting faces of the abutment plates 34, 36, 38 and 40 have an angular relationship to a line passing through the axis of rotation of the coupling and bisecting the two friction shoes such that circumferential drag of the shoes in either direction exerts a radial force at the incidental heel portion of the shoe which balances the radial pressure exerted on the toe and intermediate portion of the shoe by the shoe expanding mechanism and causes equal pressure and equal wear on the entire surface of the friction liners 32 and 32'.

By thus insuring that the wear is even over the entire surface of the liner of friction material, the life of the liner is greatly extended and frequent adjustment of the brake shoes to compensate for lining wear is rendered unnecessary.

The friction shoes are moved toward and away from the drum flange 22 by respective actuating levers, generally indicated at 60 and 62. The lever 60 is pivoted at one end on the anchor pin 50, as is clearly illustrated in Figures 1 and 2, and comprises two spaced parallel plate-like members 64 and 66 which receive between them the web portion 30 of the friction shoe 32. Approximately at the mid length portion of the lever the two portions thereof are joined by a lever saddle member comprising transverse plate member 68 welded to the inner edges of the plate members, as particularly illustrated in Figure 1. Preferably the plate members are cut away, as indicated at 70, for a portion of the thickness of the plate member 68 and the weld is applied to the exposed edge surfaces of the transverse plate member and to the edges of the cut away portion of the lever members. The saddle member may be secured to the lever side plates by other suitable means however as by induction welding or brazing. The plate member 68 bears against the flat side face of a semi-circular pressure block 72 having its semi-cylindrical surface engaged with an arcuate seat 74 provided in the inner portion of the web 30 of the brake shoe 24.

The lever member 60 is also connected to the friction shoe 24 by means of a compression spring 76 inserted in corresponding apertures 76 and 78 provided in the friction shoe and in the lever member, respectively. The aperture 76 is only slightly larger than the spring 76 but the aperture 78 is elongated to permit a limited amount of sliding movement between the friction shoe and the shoe actuating lever, sliding friction between the spring and the lever being carried through the abutment washer 80. The shoe web 30 is normally thinner than the space between the two parts of the lever member 60 but, surrounding the aperture 76, the web is provided with a thickened portion in the form of a boss 82 which contacts the adjacent surfaces of the lever side plate members to provide a firm sliding contact between the shoe web and the lever.

At its end opposite the end fulcrumed on the anchor pin 50, the lever 60 carries a transverse pin 84 which provides a bearing for the forked end of a member 86 constituting a portion of an adjustable strut member, generally indicated at 88. This strut member, as shown in section in Figures 1 and 4, comprises a sleeve portion 90 into one end of which the member 86 is screw threaded and into the other end of which there is inserted a member 92 pivotally connected by a pin or bushing 94 to one end of a cam follower lever 96 which is fulcrumed on an anchor pin 98 carried by the support member 58. The lever member 96 carries at its end opposite the pin 94 a rotatable bearing member or sleeve 100 which bears against the outer surface of a bored conical cam 102 slidably mounted on the driven member 12 for movement axially of this member to move the contacting end of the lever 96 away from the axis of rotation of the coupling when the cam member is moved to the right as viewed in Figure 2. The lever 96 comprises a primary lever and the lever 60 a secondary lever in the friction shoe expanding mechanism.

With this arrangement, when the cam member is moved to the right, as viewed in Figure 2, the contacting end of the lever 96 is moved outwardly away from the axis of rotation of the coupling and is pivoted about the anchor pin 98, moving the strut member 88 to the left as viewed in Figure 1 and forcing the end of the lever member 60 carrying the pin 84 outwardly causing this lever to swing about its pivotal connection with the anchor pin 50. This moves the lever saddle 68 outwardly, exerting pressure on the pressure plate 72 which forces the friction shoe 24 outwardly against the flange of the brake drum. The frictional drag on the shoe will then force one of the abutment plates 34 or 36, depending upon the direction of rotation of the drum, against the corresponding abutment 42 or 44 to equalize the pressure between the shoe lining and the drum, slight movement of the shoe relative to the lever 60 being permitted by the spring 76 which acts to maintain the shoe firmly in contact with the pressure plate 72 which may slide along the saddle 68 to permit this movement of the friction shoe relative to the lever. The anchor pin 52 extends through the lever 60 which is provided with an elongated slot 104 surrounding the pin, a washer (not illustrated) secured on the pin serving to provide a sliding bearing for the lever so that the lever may move freely in a radial direction with respect to pin 52 but will be restrained against tilting movement toward or away from the support member 58.

The sleeve member 90 is formed of a suitable alloy, such, for example, as manganese alloy number 772, manufactured by the W. M. Chace Company of Detroit, Michigan, which has a coefficient of expansion much greater than the coefficient of expansion of the material of the support member 58 which carries the anchor pins. A copper spring clip 110 is secured to the member 92 and overlies one end of the sleeve member 90 to hold the sleeve member in any position of adjustment to which it is moved. This spring has an elongated side portion which lies in contact with the inner surface of the drum flange 22 between adjacent ends of the two friction shoes and serves to conduct heat from the drum flange to the sleeve member 90 so that the sleeve member expands and contracts in accordance with rising and falling temperatures of the drum thereby varying the distance between the pins 84 and 94 to compensate for thermal expansion changes in the size of the drum due to frictional heating of the coupling mechanism.

The shoe 24 is urged away from the drum flange by a tension spring 112 which is connected between the levers 60 and 96, which spring also acts to maintain the rotatable sleeve 100 firmly in contact with the surface of the conical cam 102.

Centrifugal force acting on the friction shoes tending to move them into contact with the drum flange is counteracted by suitable counterweights 114 and 145 pivoted on the anchor pins 52 and 54 respectively. The counterweight 114 for the shoe 24 has a lever arm extending towards the pin 84 and receiving, in a notch 116 provided in the end thereof, a pin 118 carried by the lever member 60 adjacent the end thereof, and a weight portion 120 extends inwardly from the anchor pin 52 toward the line bi-secting the two brake shoes. With this arrangement, centrifugal force acting on the weight portion 120 of the counterweight tends to swing the counterweight about its pivotal connection with the pin 52 and move the pin 118 toward the lever 96. This force exerted by the counterweight tends to place the strut 88 in compression and swing the lever 96 in a direction to press the roller sleeve 100 firmly in contact with the conical cam 102. Actually, however, no appreciable force is transmitted through the strut 88 since the counterweight is carefully dimensioned so that it approximately neutralizes the effect of centrifugal force acting on the friction shoe 24 and prevents this centrifugal force from changing the forces necessary to move the brake shoe toward or away from the drum flange regardless of the speed of rotation of the coupling. Spring 112 will then exert a substantially constant retracting force on the friction shoe, which force is overcome by a substantially constant force exerted between the cam 102 and the contacting end of the lever 96. The counterweight 114 is also particularly designed to have the necessary freedom of movement for following movements of the friction shoe without interfering with any existing parts of the coupling mechanism.

Centrifugal force is transferred from the brake shoe 24 to the lever 60 through the compression spring 75 which is designed to transmit this force without exceeding a predetermined range of deflection.

The shoe 26 is actuated by mechanism having parts corresponding exactly to the above described parts of the mechanism for actuating the shoe 24 and including the two part lever 62 pivoted on the anchor pin 56 and carrying the lever saddle 122 bearing upon the semi-circular pressure plate 124 carried by the web portion 30' of the friction shoe 26; the primary lever 126 pivoted on the anchor pin 128 and having a roller 130 contacting the conical cam 102; the adjustable strut 132 interconnecting the levers 126 and 62; the shoe retracting spring 134; abutments 46 and 48; and the corresponding abutment plates 38 and 40 on the friction shoe 26. The strut 132 has end bearing pins 133 and 135 in the levers 126 and 62, respectively, and the sleeve portion 136 is of the same alloy of high thermal expansive characteristics as the sleeve member 90 of the strut 88 and the spring clip 138 has a portion in contact with the flange of the brake drum 16. There is also a spring 140 between the lever 62 and the friction shoe 26 disposed within aperture 142 in the shoe web surrounded by the boss 144 and projecting into the elongated aperture 146 in the lever 62. Springs 75 and 140 have only a small amount of resilient movement and when the shoes are subjected to centrifugal force they are compressed to a solid condition in which they provide positive abutments to limit outward movement of the shoes relative to the shoe carrying levers 60 and 62.

A counterweight 145 is pivotally supported on the anchor pin 54 and connected with lever 62 through pin 147 received in notch 149. This counterweight is similar to counterweight 114 and acts in the same manner to counteract the effect of centrifugal force acting on the friction shoe 26. As is particularly shown in Figure 5, the counterweights may be secured on the respective anchor pins by cap screws, as indicated at 151, and washers as indicated at 154.

Links 148 and 150 are provided, the link 148 receiving the anchor pins 56 and 98 and secured thereon by suitable horse shoe clips and the link 150 receiving the anchor pins 128 and 50 and also secured in place by horse shoe clips as illustrated. These links by joining the outer ends of two adjacent anchor pins serve to reinforce these anchor pins and particularly to reinforce the anchor pins 98 and 128 which carry the relatively heavy loads imposed thereon by the cam levers 96 and 126.

The anchor pins 54 extend through the elongated slot 152 in the lever member 62 and carries a washer 154 held on the anchor pin by cap screw 151 and serves to maintain the lever 62, the abutment 46 and the counterweight 145 in operative position in the mechanism. A similar washer and cap screw is provided for the anchor pin 52.

Preferably the cam member 102 has a key or spline connection with the driven member so that it rotates with the driven member and imposes no rotational friction on the levers 96 and 126.

Suitable means may be provided for engaging and disengaging the frictional coupling, one such arrangement being illustrated in Figure 2 for the purpose of disclosing the invention. In this arrangement the conical cam 102 is provided with an annular flange or projection 155 rotatably received in an internal annular groove provided in a non-rotatable split throwout collar 156, suitable bearings being provided between the sides of the projection 155 and the side walls of the groove in the collar 156. A throwout yoke 158 is fulcrumed on a fixed pivot 160 and connected to the collar 156 by trunnions, one of which is indicated at 162. If desired, a spring, as indicated at 164, may be connected to the mechanism in a manner to urge the cam inwardly or to the right as viewed in Figure 2, to engage the coupling, the coupling being disengaged by manual movement of the yoke 158.

Any other conventional or desired actuating mechanism may be used without in any way exceeding the scope of the invention.

As stated above, the shoes are carefully balanced against each other and the counterweights are also balanced both against each other and against the corresponding shoes. All of the other components of the mechanism are oppositely disposed and balanced against each other, as is obvious from an inspection of Figure 1, so that there is no unbalanced weight in the arrangement which would tend to set up rotational vibration during operation of the device.

The counterweights by counteracting the centrifugal force acting on the non servo acting shoes render the coupling subject to uniform and positive control, and the thermal expansion compensation, accomplished by the struts 88 and 132, by maintaining the proper clearance of the shoes and the drum regardless of the drum temperature, eliminates the necessity of frequent adjustment and friction material replacement. The shoe arrangement, because of the large area of contact acting at the maximum distance from the rotational axis, provides a construction capable of handling a maximum torque load and the shoe and drum arrangement provides for rapid dissipation of friction generated heat. There is thus provided a friction coupling device which has a high torque load capacity in both directions of rotation, maximum cooling characteristics, perfect rotational balance and freedom from vibration, high durability and satisfactory control effects.

In the modified arrangement shown in Figure 6, springs 166 and 168 are provided which may either replace or supplement the retracting springs 112 and 134 shown in Figure 1 or may be substituted for any desired portion of the mass of the counterweights 114 and 145. While these springs may be connected to the mechanism, in any desired manner, in the arrangement illustrated, extensions 170 and 172 are provided on the levers 96 and 126, respectively, extending past the respective roller bearings 100 and 130 and the spring 166 acts in tension between the end of the extension 172 on the lever 126 and the lever 96 while the spring 168 acts in tension between the end of the extension 170 on the lever 96 and the lever 126. The extensions 170 and 172 greatly increase the leverage through which the springs act, as compared with the leverage through which the springs 112 and 134 in Figure 1 act, so that much lighter springs may be used to hold the levers 96 and 126 firmly against the cam member 102. The leverage is further multiplied due to the fact that the springs 166 and 168 act directly on the primary levers, whereas in the form shown in Figure 1 the retracting springs act between the primary and secondary levers operatively associated with each friction shoe.

When the modified arrangement is used merely to supplement or replace the retracting springs 112 and 134, the counterweights would be maintained at the same mass as in the construction illustrated in Figure 1. However, it is possible to replace a portion of the counterweight mass by a constant spring force which force would overcome the centrifugal force acting on the friction shoes and maintain the shoes out of contact with the drum flange and would require only a small additional force to be applied to the cam to move the friction shoes into contact with the drum.

In the further modified form of the invention shown in Figures 7, 8, 9 and 10, a somewhat different form of friction coupling is employed but the principles utilized to operate the friction shoes and counteract the effect of centrifugal force on the shoes are substantially the same.

In this arrangement there are co-axial rotatable drive and driven members, as explained above in connection with Figures 1 and 2, one of the members carrying a support plate 174 and the other member carrying a drum having a web or disk portion 175 and an annular flange portion 176. The support plate 174 carries two adjacent anchor pins 178 and 180 which pivotally support the adjacent ends of respective arcuate friction shoes 182 and 184. A shoe retracting spring 186 is connected between the shoes adjacent to their free ends, opposite the ends mounted on the pins 178 and 180, and the shoes are expanded by means diagrammatically shown as a hydraulic device 188 in Figure 7 interposed between the free ends of the shoes. This device, as illustrated, is a conventional hydraulic shoe expanding cylinder, but it is to be understood that any conventional or desired shoe expanding mechanism may be employed without exceeding the scope of the invention, and a pair of levers, 189 and 191, fulcrumed against each other on a floating thermal expansion unit 193, have been shown in Figure 10.

Where a hydraulic cylinder expanding device is utilized, some suitable means, known to the prior art, may be employed to conduct hydraulic fluid under pressure from an exterior source to the device disposed within the rotatable coupling mechanism. Such means may involve the use of a transfer bearing on the rotatable shaft which carries the support plate and hydraulic conduits leading from the source of hydraulic fluid under pressure to the transfer bearing and from the bearing to the shoe expanding cylinder. With such an arrangement, the shoe expanding device and the retracting springs will operate in the same manner as in a brake in which the support plate 174 is held stationary.

While Figure 7 has been shown without a thermal expansion compensating element for purposes of simplifying the illustration, the inclusion of such an element is highly desirable and is shown in supplementary Figure 10. A cam 102', similar to the cam 102 of Figures 1 and 2, may be provided and may be actuated by some suitable means as indicated above. Lever 189 is pivotally connected intermediate its length at 195 to the end portion of shoe 182 and pivotally connected at its outer end to the corresponding end of thermal expansion compensating unit 193. At its inner end lever 189 carries a bearing roller 198 which contacts cam 102'. Lever 191 is pivotally connected to brake shoe 184 at 200 and to unit 193 at 202 and carries on its inner end roller 204 contacting cam 102'. When the roller carrying inner ends of the levers are forced apart by the cam the outer ends fulcrum on their connections with unit 193 and force the lever connected ends of the brake shoes apart. Shoe adjustment may be obtained by adjusting the effective length of unit 193.

At its end mounted on the respective anchor pins 178 or 180, each brake shoe is provided with an extension in the form of respective levers 190 and 192 supporting respective counterweights 194 and 196.

As particularly illustrated in Figure 9, the lever 190 pivoted on the anchor pin 180 is disposed adjacent to the support plate 174 and passes around the anchor pin 178 to support the counterweight 194 within the contour of the shoe 182, while the lever member 192 pivoted on the anchor pin 178 passes across the end of the anchor pin 180, which is shorter than the anchor pin 178, to support the counterweight 196 within the contour of the shoe 184 thus providing free movements of the shoes and their respective counterweights without interference.

The counterweights have a mass such that each counterweight substantially balances the action of centrifugal force on the friction shoe to which it is attached so that the shoes are expanded and retracted with substantially the same force applied by the expanding device 188 and the retracting spring 186 with the support plate 174 rotating at high speed as when the plate is stationary. If desired, a fixed counterweight 199 may be mounted on the support plate 174 diametrically opposite to location of the pins 178 and 180 to statically balance the difference between the weight of the anchor pins and the counterweights 194 and 196 and the weight of the shoe expanding device 188 and the retracting spring 186 so that there will be no unbalanced weight in the coupling which will tend to set up vibration when the coupling is rotated.

The brake shoes 182 and 184 are provided with linings of friction material in the conventional manner and are slidably connected with the support plate at locations intermediate their length.

While the modified form of the coupling shown in Figures 7, 8, 9 and 10, does not have all of the features making for maximum durability and positive and uniform control as described above in connection with the form of the device shown in Figures 1 and 2, it is much simpler in construction and is sufficiently sensitive and durable for many installations where these characteristics are not absolutely critical.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a friction coupling device, driving and driven members, means for frictionally coupling said members together including a friction shoe and an actuating lever therefor pivotally anchored at one of its ends on one of said members, means for moving said lever in one direction to frictionally couple said members, and means mounted on said one member adjacent to the other end of said lever for angular movement relative thereto in response to centrifugal force and operatively connected with said lever to restrain said lever and friction shoe against movement to coupling position.

2. The friction coupling device defined in claim 1, in which said last named means comprises a counterweight pivotally mounted at one end on a fixed stop limiting movement of said lever to uncoupling position.

3. In a friction coupling device, coaxial driving and driven members, coupling means mounted on one of said members comprising a friction shoe and a lever system for expanding said shoe into frictional engagement with the other member, said system including a primary lever pivotally anchored adjacent to one of its ends on said first member at one side of its axis, a secondary lever operatively connected with the friction shoe and pivotally anchored on said first member at the other side of its axis and substantially diametrically opposite to the anchored end of said primary lever, a motion transmitting connection between the other end of said secondary lever and the anchored end of said primary lever comprising a rigid strut pivotally connected to each of said levers, an axially movable operating cam coacting in its movement in one direction with the free end of said primary lever to transmit motion to said secondary lever and expand the friction shoe to coupling position, and spring means connected with one of said levers and operative to retract the friction shoe and maintain the primary lever in effective contact with the cam.

4. In the friction coupling device defined in claim 3, means for adjusting the length of said strut to vary the distance between its pivotal connection with said levers.

5. In a friction coupling device for drivingly connecting driving and driven members, a drum carried by one of said members, a support plate carried by the other of said members, friction shoes within said drum, means carried by said plate operatively supporting the shoes for radial expansion into frictional contact with the drum wall, actuating means for the shoe supporting means, centrifugally actuated counter-weights individual to the respective shoes movably mounted on said support plate, means operatively connecting said counterweights with said shoe supporting means so as to urge said shoe supporting means in shoe retracting direction in opposition to centrifugal forces acting on said shoe supporting means and tending to urge the shoes toward the drum, and means operatively connecting said actuating means with the shoe supporting means independently of said counter-weights.

6. In a friction coupling device having a flanged drum, shoes frictionally engageable with said drum flange and lever mechanism for expanding and retracting said shoes; strut members of a material having a thermal expansion coefficient higher than the thermal expansion coefficient of the material of said drum operatively connected with said lever mechanism to compensate the travel of said shoes for thermal expansion changes in said drum; and spring members carried by said strut members and contacting said drum flange for conducting heat from said flange to said strut members.

LAWRENCE R. BUCKENDALE.
RALPH K. SUPER.

REFERENCES CITED

The following references are of record in the file of this patent:

UNITED STATES PATENTS

| Number | Name | Date |
|---|---|---|
| 295,656 | Mason | Mar. 25, 1884 |
| 1,847,389 | Fawick | Mar. 1, 1932 |
| 1,873,479 | Ranch | Aug. 23, 1932 |
| 1,887,377 | McEwen | Nov. 8, 1932 |
| 1,925,897 | Fawick | Sept. 5, 1933 |
| 2,196,396 | Lane | Apr. 9, 1940 |
| 2,251,862 | Wilson | Aug. 5, 1941 |
| 2,287,238 | Goepfrich | June 23, 1942 |
| 2,337,069 | Spiller et al. | Dec. 21, 1943 |

FOREIGN PATENTS

| Number | Country | Date |
|---|---|---|
| 9,309 | Great Britain | 1901 |